United States Patent
Behl et al.

(10) Patent No.: US 11,645,743 B2
(45) Date of Patent: May 9, 2023

(54) METHOD, MEDIUM, AND SYSTEM FOR DETECTING POTATO VIRUS IN A CROP IMAGE

(71) Applicant: Resson Aerospace Corporation, Fredericton (CA)

(72) Inventors: Rishin Behl, Fredericton (CA); William Ross, Fredericton (CA)

(73) Assignee: Resson Aerospace Corporation, Fredericton (CA)

( * ) Notice: Subject to any disclaimer, the term of this patent is extended or adjusted under 35 U.S.C. 154(b) by 115 days.

(21) Appl. No.: 17/182,486

(22) Filed: Feb. 23, 2021

(65) Prior Publication Data

US 2021/0183048 A1 Jun. 17, 2021

Related U.S. Application Data

(63) Continuation of application No. 16/379,906, filed on Apr. 10, 2019, now Pat. No. 10,964,009, which is a
(Continued)

(51) Int. Cl.
*G06K 9/00* (2022.01)
*G06T 7/00* (2017.01)
(Continued)

(52) U.S. Cl.
CPC .............. *G06T 7/0004* (2013.01); *A01G 7/00* (2013.01); *A01G 13/00* (2013.01); *A01G 22/25* (2018.02);
(Continued)

(58) Field of Classification Search
CPC .................................................... G01B 11/24
See application file for complete search history.

(56) References Cited

U.S. PATENT DOCUMENTS 5,485,406 A * 1/1996 Wada .................. G01M 17/027
73/146
8,086,046 B2 12/2011 Fujita
(Continued)

FOREIGN PATENT DOCUMENTS

CN 101021939 A 8/2007
CN 102759528 A 10/2012
(Continued)

OTHER PUBLICATIONS

"Notice of Refusal" (Office Action), issued in related Japanese App. No. 2019-541830, dated Sep. 7, 2021.
(Continued)

*Primary Examiner* — Hadi Akhavannik
(74) *Attorney, Agent, or Firm* — Bereskin & Parr LLP/S.E.N.C.R.L., s.r.l.

(57) ABSTRACT

A method of detecting a potato virus in a crop image depicting at least one potato plant includes storing the crop image in a memory, identifying a first region of the crop image depicting potato plant leaves, identifying a plurality of edges within the first region, determining whether an image segment of the crop image within the first region satisfies one or more leaf creasing criteria symptomatic of leaf creasing caused by the virus based on the edges that are located within the image segment, determining whether the image segment satisfies one or more color criteria symptomatic of discoloration caused by the virus, and determining whether the segment displays symptoms of potato virus based on whether the image segment satisfies one or more of the leaf creasing criteria and the color criteria. A system and computer readable medium are also disclosed.

27 Claims, 15 Drawing Sheets

Related U.S. Application Data continuation of application No. PCT/CA2017/051214, filed on Oct. 12, 2017.

(60) Provisional application No. 62/408,234, filed on Oct. 14, 2016, provisional application No. 62/407,882, filed on Oct. 13, 2016.

(51) Int. Cl.
  *A01G 13/00* (2006.01)
  *A01G 7/00* (2006.01)
  *G06T 7/136* (2017.01)
  *G06T 7/13* (2017.01)
  *G06T 7/90* (2017.01)
  *A01G 22/25* (2018.01)
  *A01D 33/00* (2006.01)

(52) U.S. Cl.
  CPC .............. *G06T 7/13* (2017.01); *G06T 7/136* (2017.01); *G06T 7/90* (2017.01); *A01D 33/00* (2013.01); *G06T 2207/10024* (2013.01); *G06T 2207/30128* (2013.01)

(56) References Cited

U.S. PATENT DOCUMENTS

| | | | |
|---|---|---|---|
| 8,139,858 | B1 | 3/2012 | Landwehr et al. |
| 8,417,534 | B2 | 4/2013 | Belzer et al. |
| 8,781,174 | B2 | 7/2014 | Tseng et al. |
| 8,923,569 | B2 | 12/2014 | Duarte |
| 9,230,170 | B2 | 1/2016 | Naganuma et al. |
| 2013/0136312 | A1 | 5/2013 | Tseng et al. |
| 2013/0156271 | A1 | 6/2013 | Cimino |
| 2013/0276368 | A1 | 10/2013 | Takayama et al. |
| 2014/0089045 | A1 | 3/2014 | Johnson |
| 2014/0316614 | A1 | 10/2014 | Newman |
| 2014/0343863 | A1* | 11/2014 | Imanishi ............ G01N 21/6408 702/19 |
| 2015/0015697 | A1 | 1/2015 | Redden et al. |
| 2015/0131867 | A1 | 5/2015 | Lin et al. |
| 2016/0050840 | A1* | 2/2016 | Sauder ................. G05D 1/106 701/3 |
| 2017/0161560 | A1* | 6/2017 | Itzhaky ................... G06N 3/08 |
| 2018/0253600 | A1* | 9/2018 | Ganssle ............. G06V 20/188 |
| 2019/0236771 | A1 | 8/2019 | Behl et al. |

FOREIGN PATENT DOCUMENTS

| | | |
|---|---|---|
| CN | 202904667 U | 4/2013 |
| CN | 103514459 A | 1/2014 |
| CN | 103593652 A | 2/2014 |
| CN | 103778628 A | 5/2014 |
| CN | 103955938 A | 7/2014 |
| CN | 104063686 A | 9/2014 |
| CN | 104680524 A | 6/2015 |
| CN | 102945376 B | 3/2016 |
| CN | 106023159 A | 10/2016 |
| CN | 106023159 B | 2/2019 |
| JP | 10090066 A | 4/1998 |
| JP | 2012080790 A | 4/2012 |
| KR | 101545479 B1 | 8/2015 |
| RU | 2558225 C2 | 7/2015 |
| WO | 2011160159 A1 | 12/2011 |
| WO | 201611376 A1 | 1/2016 |
| WO | 2016110832 A1 | 7/2016 |
| WO | 2016111376 A1 | 7/2016 |
| WO | 2018068143 A1 | 4/2018 |

OTHER PUBLICATIONS

"Preliminary Office Action & Search Report", Issued in related Brazilian App. No. BR112019007519-4, dated Aug. 17, 2021.

"Examination Report", issued in related Indian App. No. 201917017116, dated Nov. 8, 2021.

Viral disease of vegetable, Method for distinction and its prevention; Pest control series part 2, Japan, Fukushima Prefecture, Fukushima plant protection association, Mar. 1990, p. 13-16.

Vishnu S and A. Ranjith Ram, "Plant Disease Detection Using Leaf Pattern: A Review", IJSET—International Journal of Innovative Science, Engineering & Technology, vol. 2 Issue 6, Jun. 2015. ISSN 2348-7968, pp. 774-780. Available Online: https://pdfs.semanticscholar.org/2721/01aa6632085c84b37ae3fc42a304546ab4e0.pdf.

Document relating to International Search Report and Written Opinion, dated Jan. 15, 2018 for International Application No. PCT/CA2017/051214, 7 pages.

Document relating to European Application No. 17859417.2, dated May 19, 2020 (Extended European Search Report)., 12 pages.

Anthonys G et al: "An image recognition system for crop disease identification of paddy fields in Sri Lanka", Industrial and Information Systems (ICIIS), 2009 International Conference on, IEEE, Piscataway, NJ, USA, Dec. 28, 2009, pp. 403-407, XP031647924.

Mahlein, Anne-Katrin : "Plant Disease Detection by Imaging Sensors—Parallels and Specific Demands for Precision Agriculture and Plant Phenotyping", Plant Disease, vol. 100, No. 2, Feb. 2016, pp. 241-251, XP055505859.

Neumann et al: "Erosion Band Features for Cell Phone Image Based Plant Disease Classification", International Conference on Pattern Recognition, IEEE Computer Society, US, Aug. 24, 2014, pp. 3315-3320, XP032698714.

Kahar et al: "Early Detection and Classification of Paddy Diseases with Neural Networks and Fuzzy Logic", Proceedings of the 17th International Conference on Mathematical and Computational Methods in Science and Engineering, Macmese, 2015, pp. 248-257, XP055692543.

M. Sonka, V. Hlavac, R. Boyle: "Image Processing, Analysis, and Machine," Vision 2nd Edition, 1998. pp. 76-97, 134-143, 646-661 and 666-671.

Documents relating to Russian Application No. 2019113996 dated Oct. 29, 2020 (Office Action & Search Report), 7 pages.

Documents relation to CN Application No. 201780063280, dated Nov. 23, 2020 (Office Action & Search Report)—partial English translation, 15 pages.

Rathod, Arti N., Bhavesh Tanawal, and Vatsal Shah. "Image processing techniques for detection of leaf disease." International Journal of Advanced Research in Computer Science and Software Engineering 3.11 (2013) (Year: 2013).

Gavhale, Kiran R., and Ujwalla Gawande. "An overview of the research on plant leaves disease detection using image processing techniques." IOSR Journal of Computer Engineering (IOSR-JCE) 16.1 (2014): 10-16. (Year: 2014).

\* cited by examiner

METHOD, MEDIUM, AND SYSTEM FOR DETECTING POTATO VIRUS IN A CROP IMAGE

FIELD

The present application relates to methods, mediums, and systems for detecting potato virus in crop images.

INTRODUCTION

In recent years, potato viruses, such as potato virus Y, have had devastating effects on potato crops in various parts of the world. It has been reported that an infected potato field may ultimately result in 10-100% loss in yield. Potato viruses are commonly spread by aphid vectors which acquire viruses from infected plants and spread the viruses to healthy plants they later feed upon. The spread of the virus can be mitigated by rogueing infected plants. However, searching for infected plants in large crop fields can be challenging and time consuming.

SUMMARY

In one aspect, the disclosure relates to a method of detecting a potato virus in a crop image depicting at least one potato plant. The method comprises storing the crop image in a memory; identifying, by a processor, a first region of the crop image, the first region depicting potato plant leaves, wherein the first region is exclusive of a second region of the crop image, the second region depicting non-leaf imagery; identifying, by the processor, a plurality of edges within the first region; determining, by the processor, whether an image segment of the crop image within the first region satisfies one or more leaf creasing criteria based on the edges that are located within the image segment, wherein the leaf creasing criteria are symptomatic of leaf creasing caused by the virus; determining, by the processor, whether the image segment satisfies one or more color criteria symptomatic of discoloration caused by the virus; and determining, by the processor, whether the segment displays symptoms of potato virus based on whether the image segment satisfies one or more of the leaf creasing criteria and the color criteria.

In another aspect, the disclosure relates to a computer-readable medium comprising instructions executable by a processor, wherein the instructions when executed configure the processor to: store the crop image in a memory; identify a first region of the crop image, the first region depicting potato plant leaves, wherein the first region is exclusive of a second region of the crop image, the second region depicting non-leaf imagery; identify a plurality of edges within the first region; determine whether an image segment of the crop image within the first region satisfies one or more leaf creasing criteria based on the edges that are located within the image segment, wherein the leaf creasing criteria are symptomatic of leaf creasing caused by a potato virus; determine whether the image segment satisfies one or more color criteria symptomatic of discoloration caused by the virus; and determine whether the segment displays symptoms of potato virus based on whether the image segment satisfies one or more of the leaf creasing criteria and the color criteria.

In a further aspect, the disclosure relates to a system for detecting potato virus in a crop image containing potato plants, the system comprising: a memory storing computer readable instructions and the crop image; and a processor configured to execute the computer readable instructions, the computer readable instructions configuring the processor to: store the crop image in a memory; identify a first region of the crop image, the first region depicting potato plant leaves, wherein the first region is exclusive of a second region of the crop image, the second region depicting non-leaf imagery; identify a plurality of edges within the first region; determine whether an image segment of the crop image within the first region satisfies one or more leaf creasing criteria based on the edges that are located within the image segment, wherein the leaf creasing criteria are symptomatic of leaf creasing caused by the virus; determine whether the image segment satisfies one or more color criteria symptomatic of discoloration caused by the virus; and determine whether the segment displays symptoms of potato virus based on whether the image segment satisfies one or more of the leaf creasing criteria and the color criteria.

DRAWINGS

Figure 4:
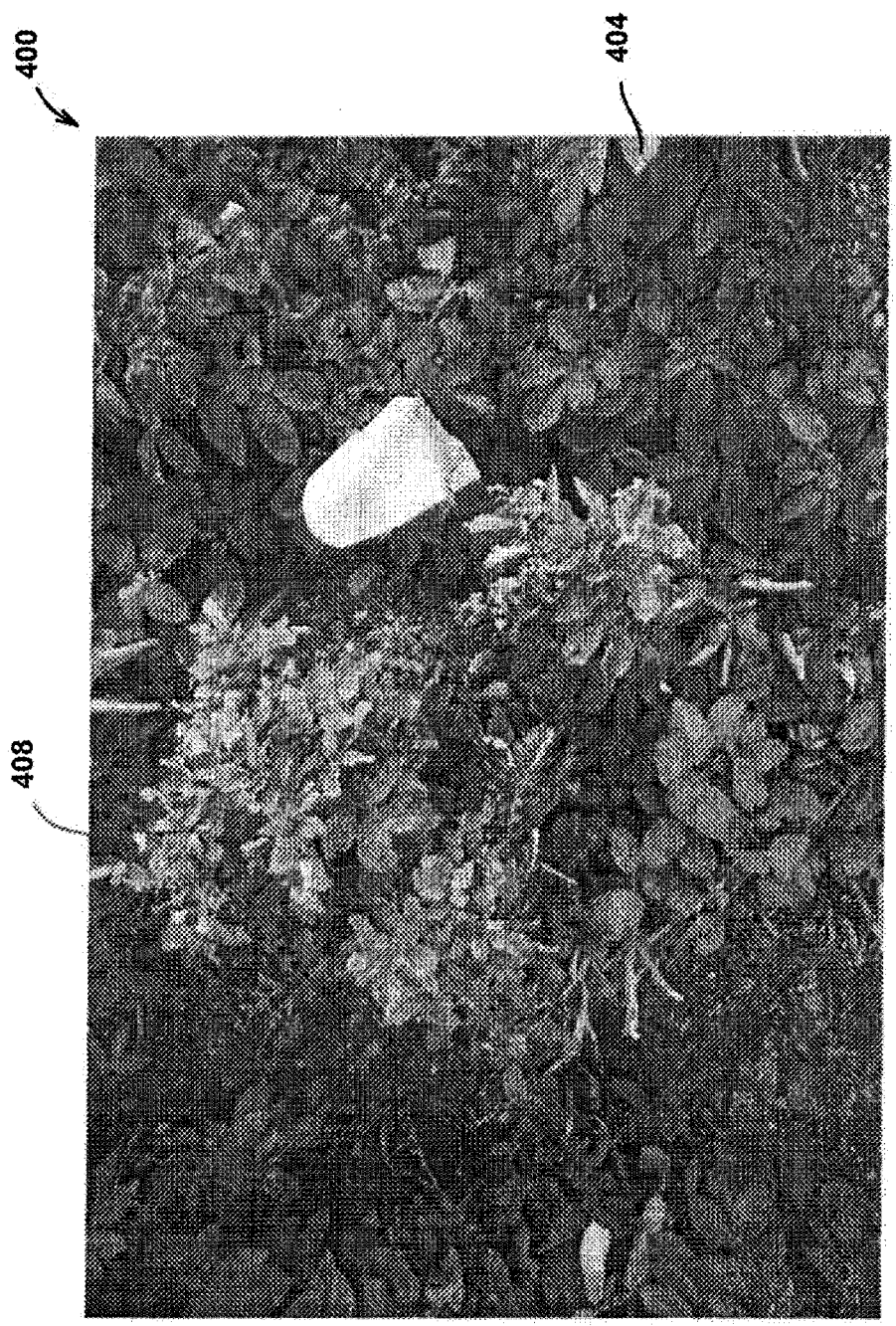
FIG. 4 is an example of a crop image.
Figure 9:
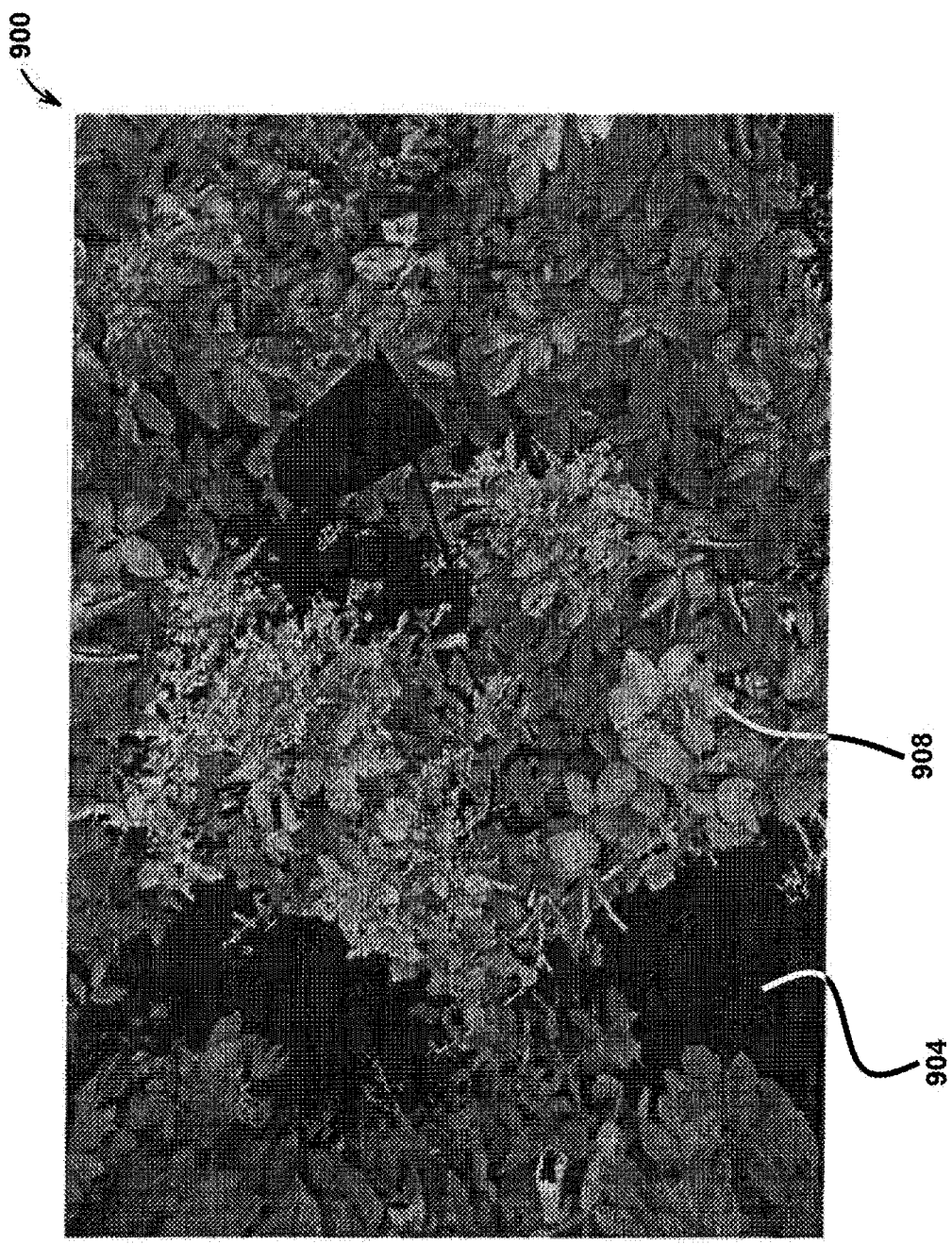
Figure 10:
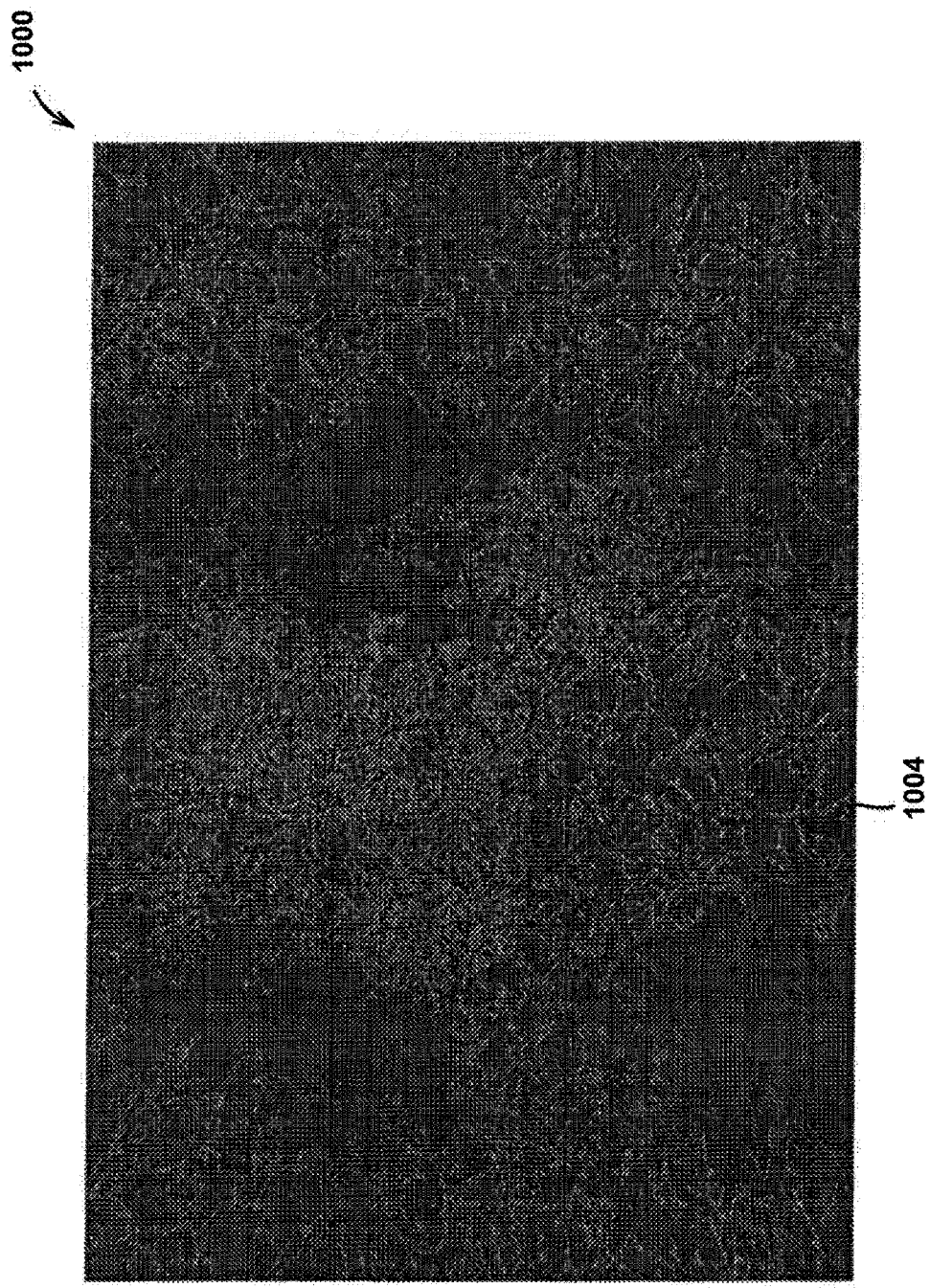
Figure 11:
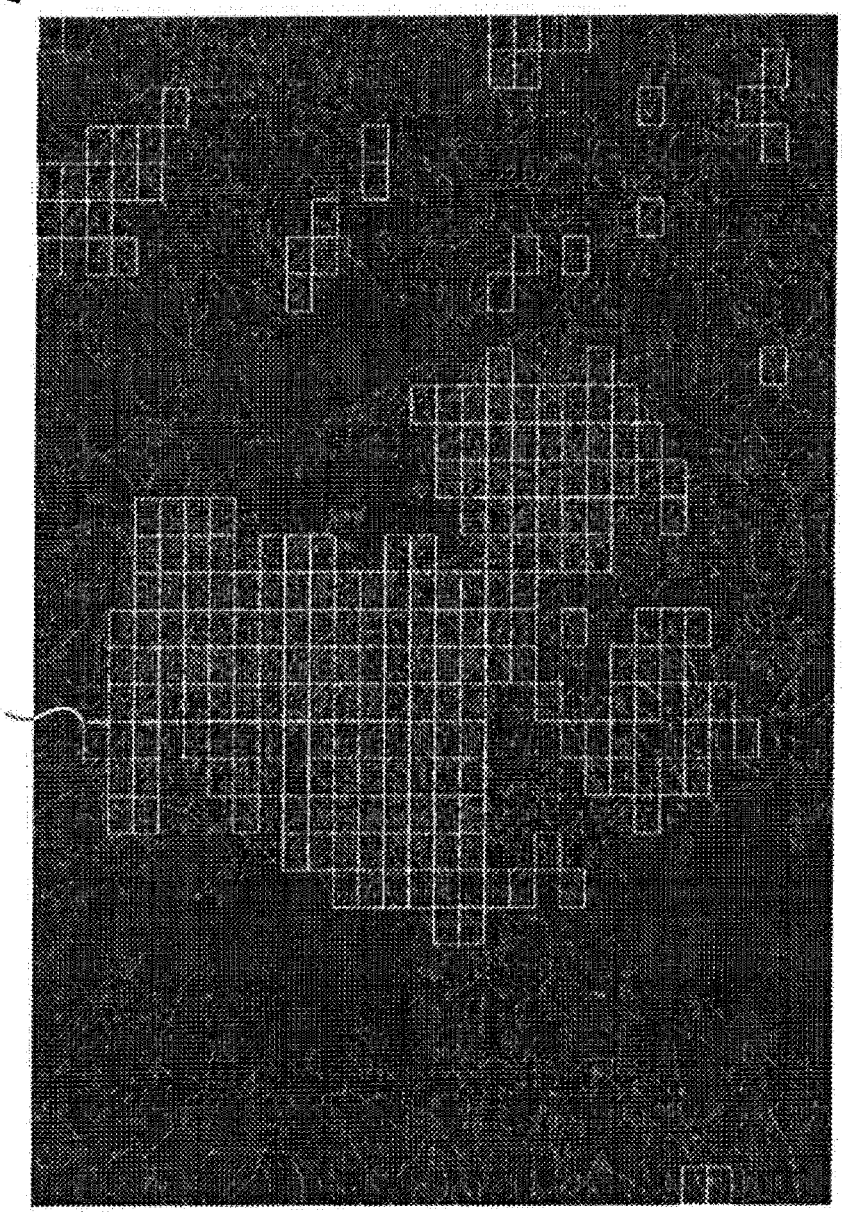
Figure 12:
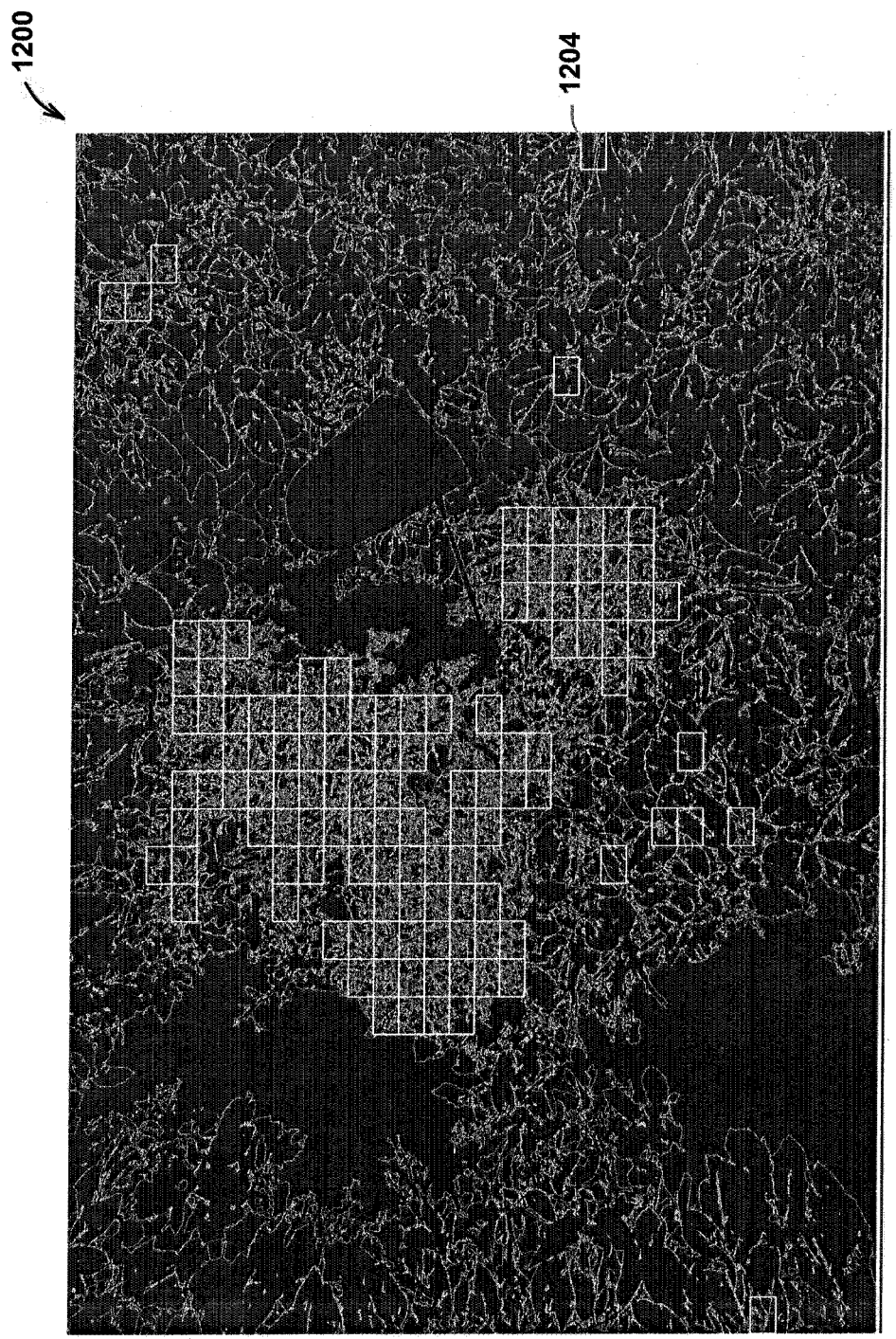
Figure 13:
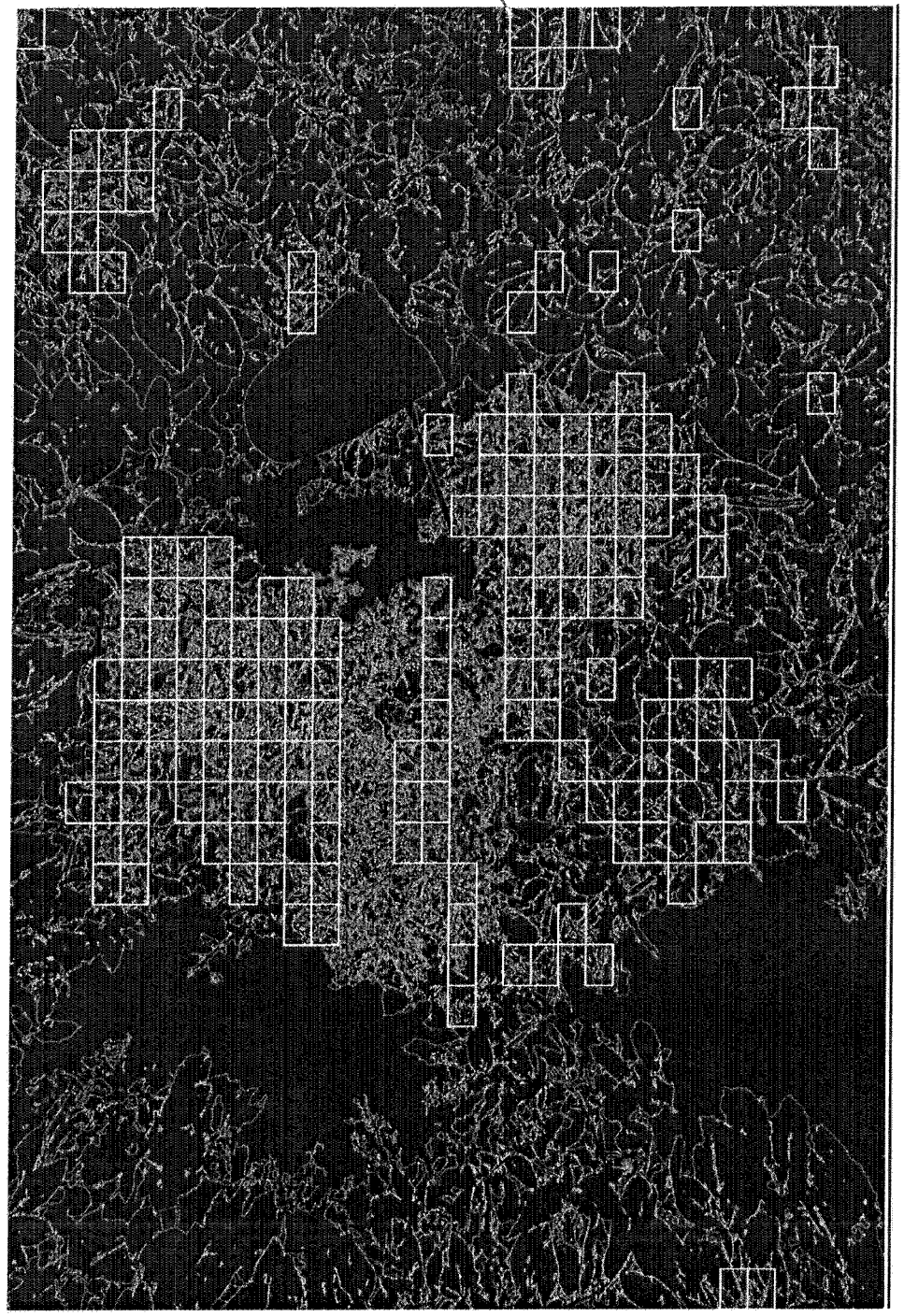
Figure 14:
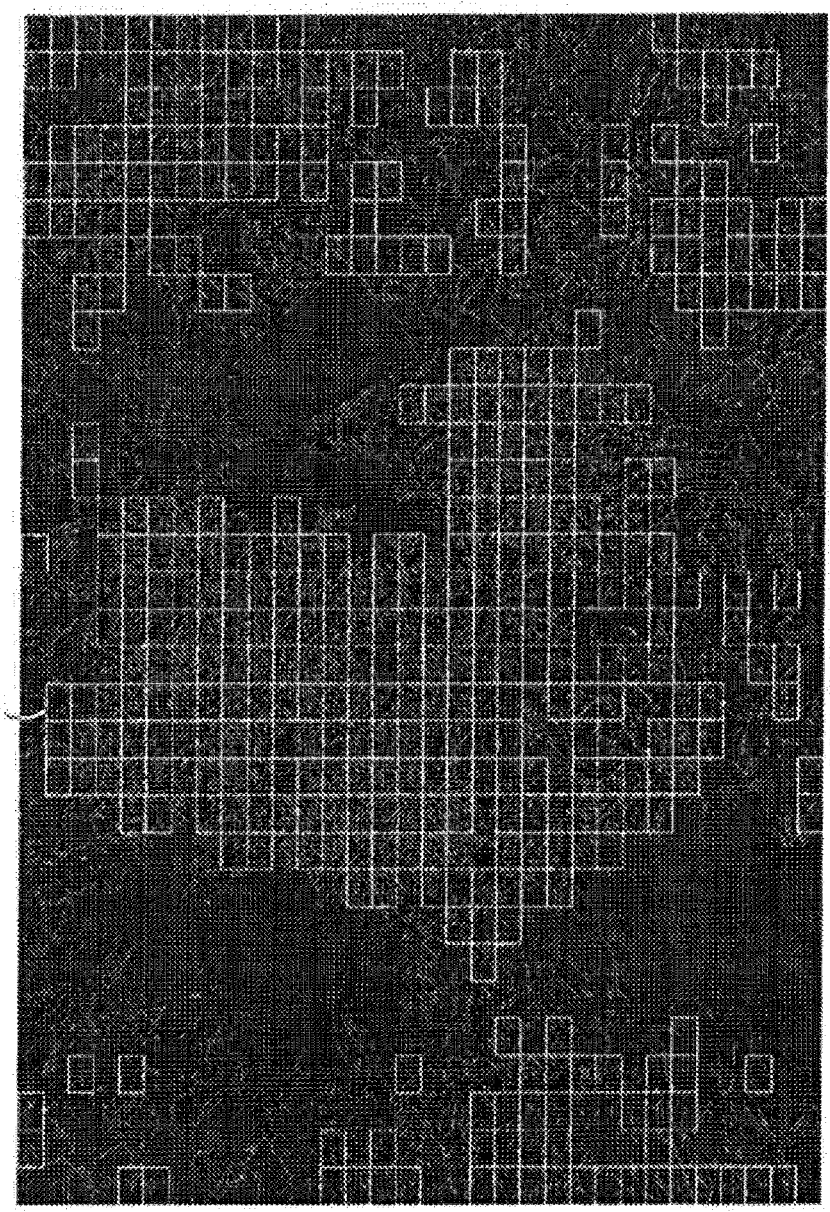
Figure 15:
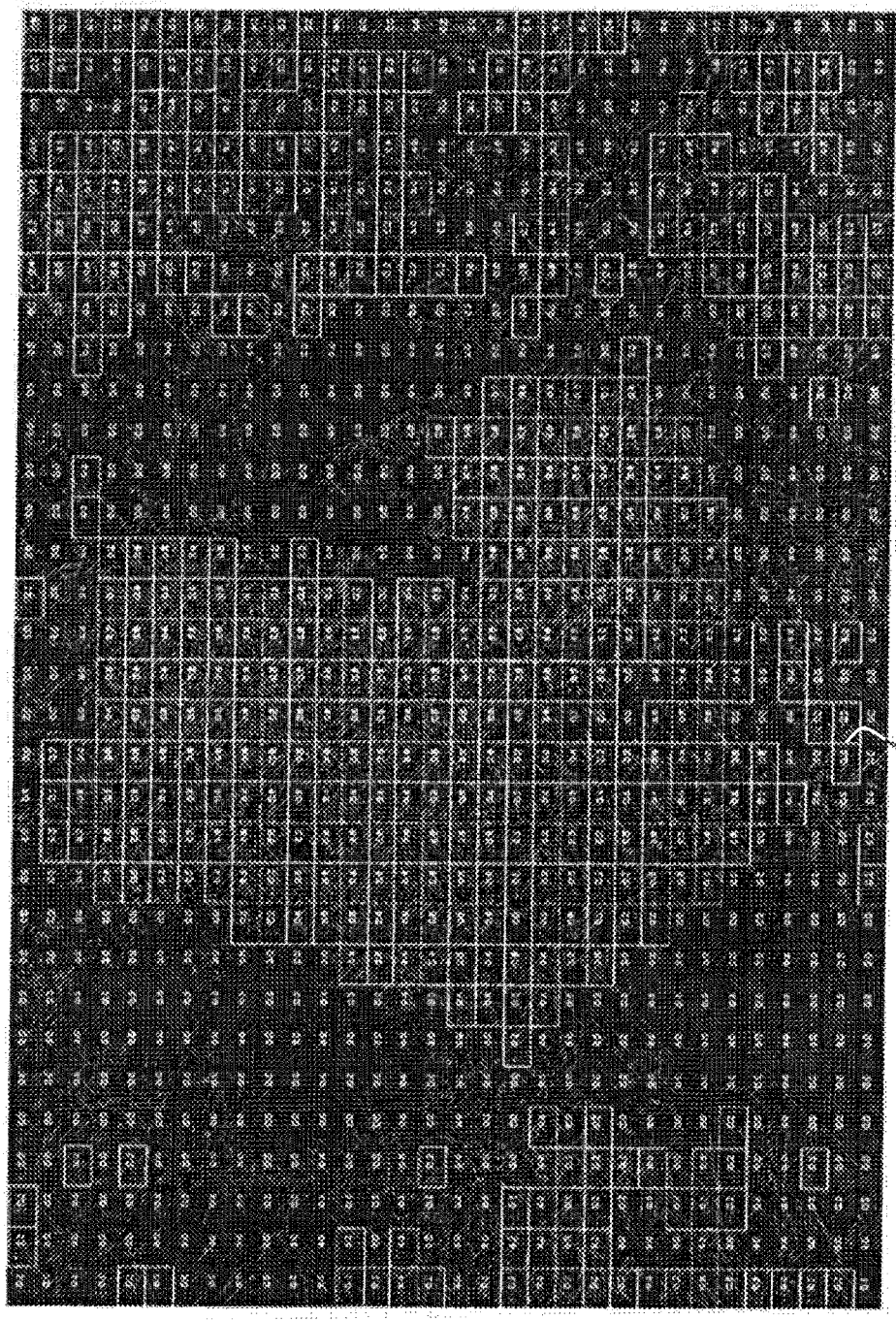

FIG. 9 the crop image of FIG. 4 after masking non-leaf regions;

FIG. 10 is an image depicting edges detected in the crop image of FIG. 4;

FIG. 11 is an image identifying image segments satisfying edge criteria;

FIG. 12 is an image identifying image segments satisfying line criteria;

FIG. 13 is an image identifying image segments satisfying contour criteria;

FIG. 14 is an image identifying image segments satisfying color criteria; and FIG. 15 is an image identifying image segments satisfying at least one of edge, line, contour, and color criteria.

DESCRIPTION OF VARIOUS EMBODIMENTS

Numerous embodiments are described in this application, and are presented for illustrative purposes only. The described embodiments are not intended to be limiting in any sense. The invention is widely applicable to numerous embodiments, as is readily apparent from the disclosure herein. Those skilled in the art will recognize that the present invention may be practiced with modification and alteration without departing from the teachings disclosed herein. Although particular features of the present invention may be described with reference to one or more particular embodiments or figures, it should be understood that such features are not limited to usage in the one or more particular embodiments or figures with reference to which they are described.

The terms "an embodiment," "embodiment," "embodiments," "the embodiment," "the embodiments," "one or more embodiments," "some embodiments," and "one embodiment" mean "one or more (but not all) embodiments of the present invention(s)," unless expressly specified otherwise.

The terms "including," "comprising" and variations thereof mean "including but not limited to," unless expressly specified otherwise. A listing of items does not imply that any or all of the items are mutually exclusive, unless expressly specified otherwise. The terms "a," "an" and "the" mean "one or more," unless expressly specified otherwise.

Although method steps may be described or listed in the disclosure and in the claims in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously, and some steps may be omitted.

Known methods for detecting for potato virus include sending physical plant samples to laboratories for testing. The time to collect and ship samples and wait for results can create delay that leads to further spreading of the virus. Also, for large crop fields, it may be impractical to collect, ship, and pay for testing enough samples to reliably detect potato virus across the whole plantation.

Embodiments disclosed herein relate to image based detection of potato virus. This may provide a fast, accurate, and inexpensive alternative to laboratory based testing of potato crops for potato virus. In an embodiment of the disclosure, the potato virus is a potato mosaic virus. In various embodiments of the disclosure, the potato virus is a potato virus X (PVX), potato virus S (PVS), potato virus M (PVM), potato virus Y (PVY), or potato virus A (PVA), or a combination of two or more such viruses. By way of overview, crop images of a crop field (including, for example, a crop field in a greenhouse) containing plants, for example, potato plants, are captured for analysis. For example, aerial drones or cameras mounted to farm equipment (e.g. a combine harvester) can be used to capture crop images. A computer processor manipulates and analyzes the crop images for visible symptoms of potato virus, such as leaf creasing and leaf discoloration. Based on the severity of the detected symptoms, the processor identifies whether the crop image contains infected plants, for example, infected potato plants. With this information, the identified plants, for example, the identified potato plants can be rogued to mitigate the spread of the virus. A potato virus of the disclosure may infect a plant, for example, a plant of the family Solanaceae, such as a potato plant. Thus, in various embodiments, the method, computer-readable medium, and system of the disclosure relate to the detection of a potato virus in a crop image depicting a plant, for example, a plant of the family Solanaceae, such as a potato plant. In various embodiments, a potato plant of the disclosure is any potato plant (*Solanum tuberosum* L.), for example, waxy potato (e.g. fingerling potatoes), starchy potato (e.g. Russet Burbank), yellow potato (e.g. Yukon gold potato), white potato (e.g. Shepody), red potato, blue potato, or a combination of two or more such plants.

Figure 1:
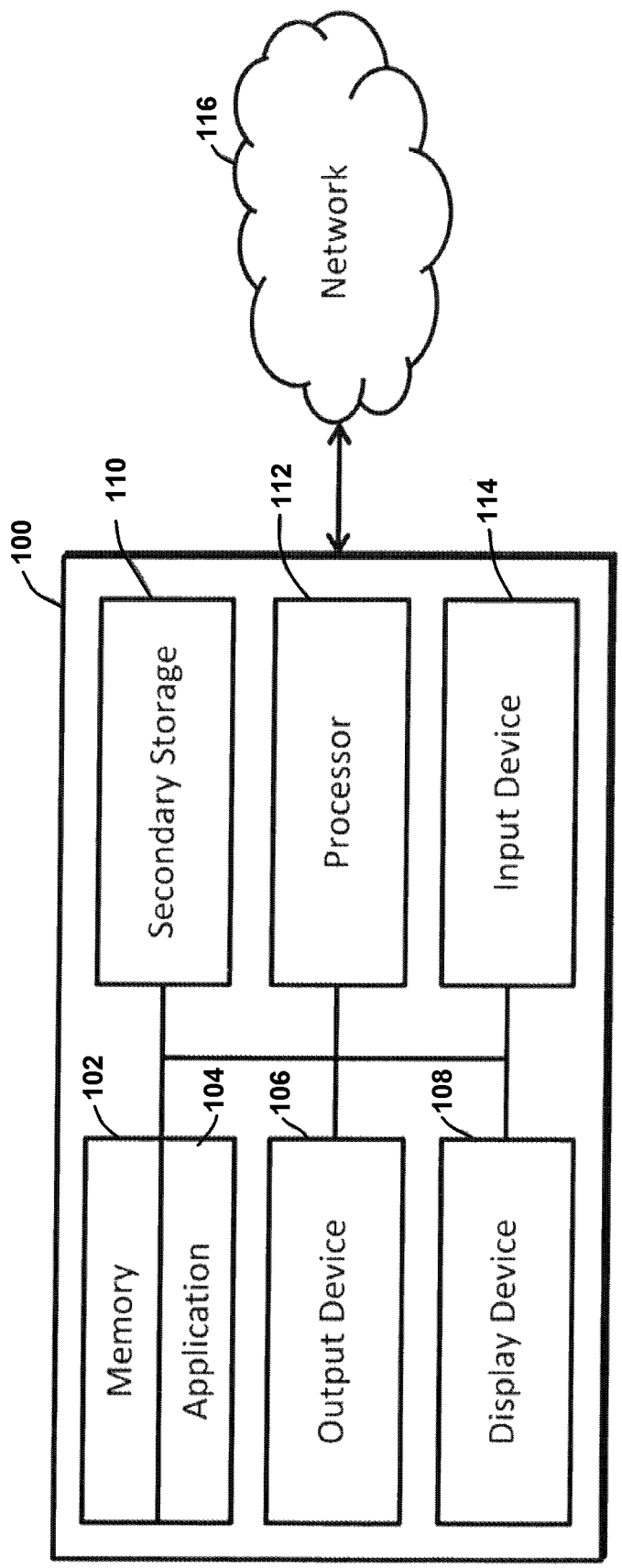
FIG. 1 shows a schematic illustration of a system, in accordance with an embodiment.

FIG. 1 shows an example schematic of a system 100. Generally, a system 100 can be a server computer, desktop computer, notebook computer, tablet, PDA, smartphone, or another system that can perform the methods described herein. In at least one embodiment, system 100 includes a connection with a network 116 such as a wired or wireless connection to the Internet or to a private network.

In the example shown, system 100 includes a memory 102, an application 104, an output device 106, a display device 108, a secondary storage device 110, a processor 112, and an input device 114. In some embodiments, system 100 includes multiple of any one or more of memory 102, application 104, output device 106, display device 108, secondary storage device 110, processor 112, input device 114, and network connections (i.e. connections to network 116 or another network). In some embodiments, system 100 does not include one or more of applications 104, secondary storage devices 110, network connections, input devices 114, output devices 106, and display devices 108.

Memory 102 can include random access memory (RAM) or similar types of memory. Also, in some embodiments, memory 102 stores one or more applications 104 for execution by processor 112. Application 104 corresponds with software modules including computer executable instructions to perform processing for the functions and methods described below. Secondary storage device 110 can include a hard disk drive, floppy disk drive, CD drive, DVD drive, Blu-ray drive, solid state drive, flash memory or other types of non-volatile data storage.

In some embodiments, system 100 stores information in a remote storage device, such as cloud storage, accessible across a network, such as network 116 or another network. In some embodiments, system 100 stores information distributed across multiple storage devices, such as memory 102 and secondary storage device 110 (i.e. each of the multiple storage devices stores a portion of the information and collectively the multiple storage devices store all of the information). Accordingly, storing data on a storage device as used herein and in the claims means storing that data in a local storage device; storing that data in a remote storage device; or storing that data distributed across multiple storage devices, each of which can be local or remote.

Generally, processor 112 can execute applications, computer readable instructions, or programs. The applications, computer readable instructions, or programs can be stored in memory 102 or in secondary storage 110, or can be received from remote storage accessible through network 116, for example. When executed, the applications, computer readable instructions, or programs can configure the processor 112 (or multiple processors 112, collectively) to perform one or more acts of the methods described herein, for example.

Input device 114 can include any device for entering information into device 100. For example, input device 114 can be a keyboard, key pad, cursor-control device, touch-screen, camera, or microphone. Input device 114 can also include input ports and wireless radios (e.g. Bluetooth® or 802.11x) for making wired and wireless connections to external devices.

Display device 108 can include any type of device for presenting visual information. For example, display device 108 can be a computer monitor, a flat-screen display, a projector, or a display panel.

Output device 106 can include any type of device for presenting a hard copy of information, such as a printer for example. Output device 106 can also include other types of output devices such as speakers, for example. In at least one embodiment, output device 106 includes one or more of output ports and wireless radios (e.g. Bluetooth® or 802.11x) for making wired and wireless connections to external devices.

FIG. 1 illustrates one example hardware schematic of a system 100. In alternative embodiments, system 100 contains fewer, additional, or different components. In addition, although aspects of an implementation of system 100 are described as being stored in memory, one skilled in the art will appreciate that these aspects can also be stored on or read from other types of computer program products or computer-readable media, such as secondary storage devices, including hard disks, floppy disks, CDs, or DVDs; or other forms of RAM or ROM.

FIG. 1 is to be referred to for the remainder of the description wherever reference is made to system 100 or a component thereof.

The flowcharts in the Figures illustrate the architecture, functionality, and operation of possible implementations of systems, methods and computer readable media according to various embodiments. In this regard, each block in the flowcharts may represent a module, segment, or portion of code, which comprises one or more executable instructions for implementing the specified logical function(s). It will be appreciated that any one or more (or all) blocks of the flowcharts can be implemented by special purpose hardware-based systems that perform the specified functions or acts, or by combinations of special purpose hardware and computer instructions.

Figure 2:
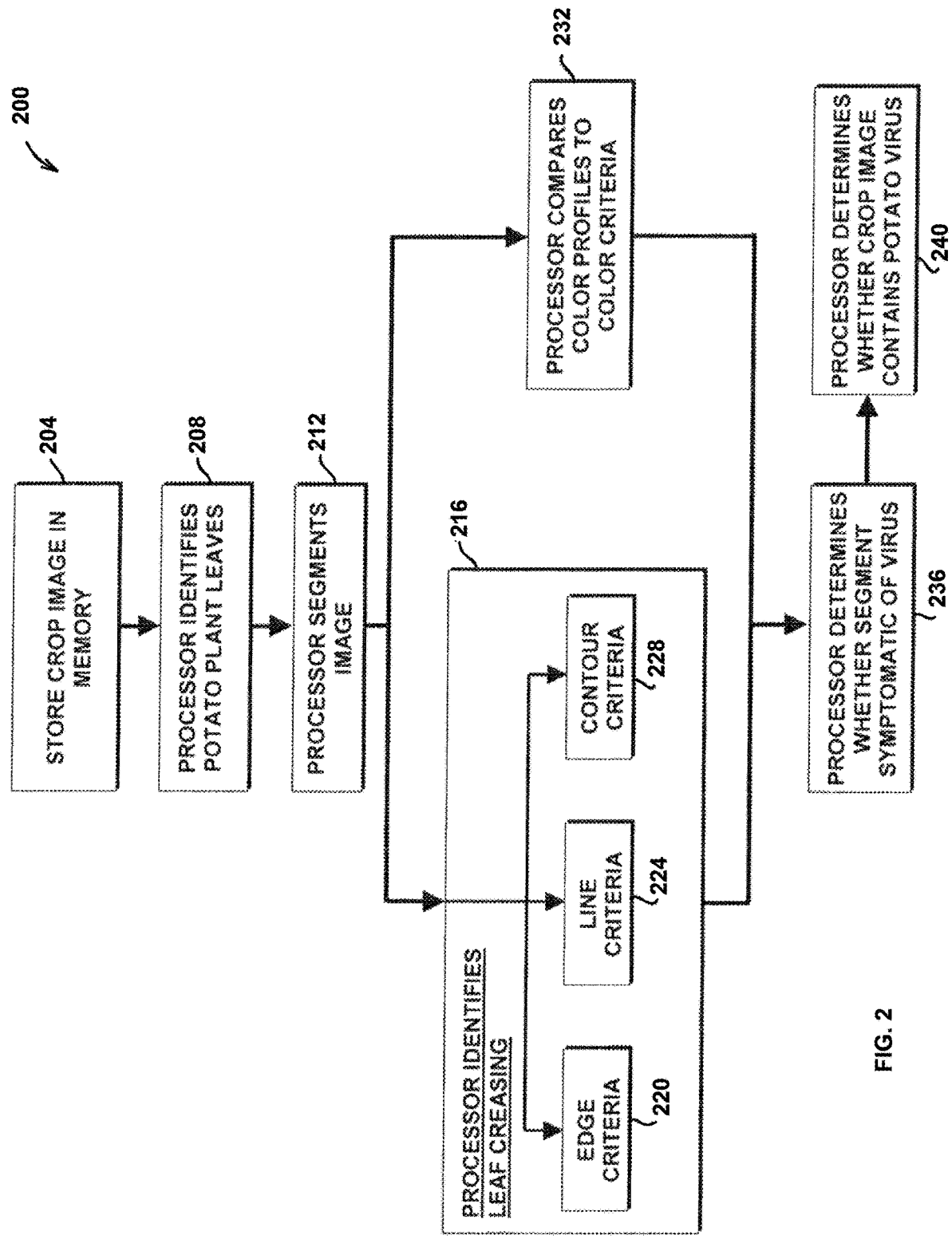
FIG. 2 is a flowchart illustrating a method of detecting potato virus in a crop image.

Reference is now made to FIG. 2, which shows a flowchart illustrating a method 200 of detecting potato virus in a crop image. At 204, a crop image is stored in memory 102. An example of a crop image 400 is shown in FIG. 4. As shown, crop image 400 may be a photograph taken from above a crop field, looking downwardly towards the potato plants 404. The aerial perspective can provide good visibility of the potato plant leaves 408, which display the virus symptoms that the method relies upon for its analysis.

The crop image 400 can be taken in any manner, with any camera or camera-equipped device. For example, the crop image 400 can be taken by a farmer or service provider using a digital camera (e.g. point-and-shoot, digital SLR, or video camera), a camera-equipped smartphone, a camera mounted to farm equipment (e.g. a combine harvester), or a camera-equipped drone. The crop image 400 can include a discrete photograph, an image stitched together from many photographs (e.g. panorama), or one or more frames of a video recording, for example.

The crop image 400 can include any number of potato plants. For example, the crop image 400 can include between a portion of one potato plant and an entire crop-field of potato plants. Preferably, crop image 400 includes a plurality of potato plants. This can allow the detection method to perform a computationally efficient bulk analysis on the plurality of potato plants shown in a crop image. For example, a crop field of several hundred acres may be captured by a few hundred photographs or less (e.g. 1-700 photographs), which can allow for efficient analysis by the method 200. The computational efficiency of the method 200 can allow an entire crop field to be analyzed for potato virus on a regular basis (e.g. daily, weekly, or monthly).

The method 200 determines whether a crop image contains potato virus based on visible symptoms which appear on the leaves of the depicted potato plants. At 208, processor 112 identifies a first region of crop image 400 (FIG. 4) containing potato leaves, which is exclusive of a second region of the crop image 400 (FIG. 4) containing non-leaf imagery, such as dirt and debris. In some embodiments, processor 112 may delete, paint over, or otherwise alter the second region to exclude that second region from subsequent analysis. For example, processor 112 may create and apply one or more image masks to crop image 400 (FIG. 4) in order to remove non-leaf imagery from subsequent analysis.

Figure 3:
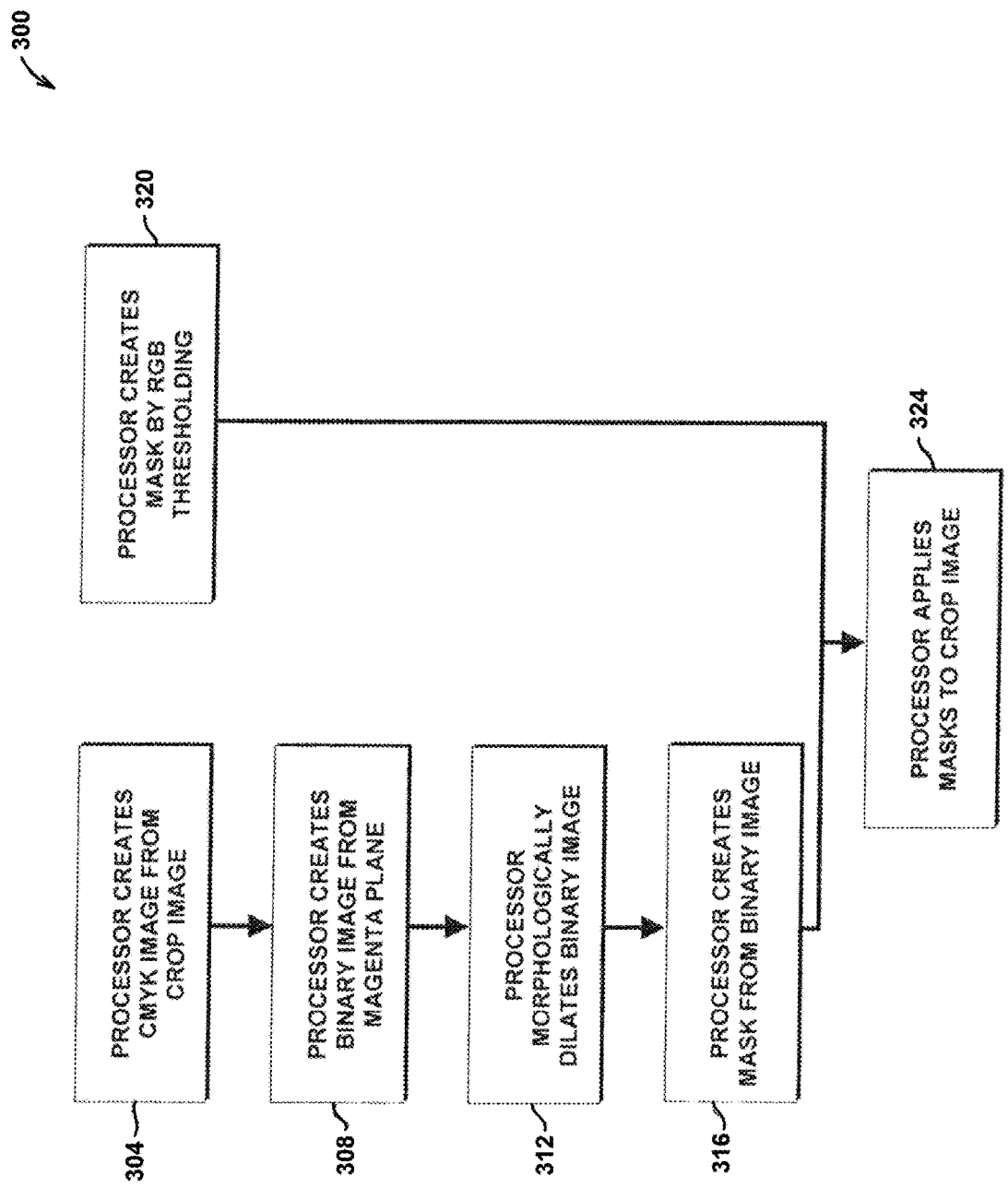
FIG. 3 is a flowchart illustrating a method of identifying potato plant leaves in a crop image.

FIG. 3 is a flowchart illustrating a method 300 of identifying potato leaves in a crop image, which includes creating and applying two color-based image masks to the crop image. Steps 304-316 relate to the creation of a magenta plane based image mask, and step 320 relates to the creation of an RGB based color mask. The two masks are applied to the crop image 400 (FIG. 4) at 324. It will be appreciated that although good results have been obtained by creating and applying both of the described color-based image masks, satisfactory results may be achieved by creating and applying just one of the two color-based image masks, or one or more different color-based image masks. In some embodiments, identifying the potato leaves may include creating and applying one or both of the described color-based image masks, in addition to creating and applying another color-based image mask.

Most cameras are configured to capture images mapped to RGB space. At 304, processor 112 creates a CMYK image from the crop image 400 (FIG. 4) and stores the image in memory 102. Processor 112 can convert the crop image (or a copy thereof) to a CMYK image according to any method known in the art. This step can be omitted where the captured crop image 400 (FIG. 4) is already mapped to the CMYK color space.

Figure 5:
FIG. 5 shows the magenta channel of the crop image of FIG. 4.
Figure 6:
FIG. 6 is a binary image based on the magenta channel of FIG. 5.

The inventors have found that the magenta plane of a crop image is effective for isolating non-leaf imagery. At 308, processor 112 creates a binary image from the magenta plane of the CMYK image. FIG. 5 shows an example of the magenta plane 500 of crop image 400 (FIG. 4). FIG. 6 shows an example of a binary image 600 created based on the magenta plane 500 (FIG. 5) of crop image 400 (FIG. 4). In a binary image, all of the pixels are either a first or second color (typically white or black). For clarity of illustration, the examples below refer to binary images as having white or black pixels. However, it is expressly contemplated that in other embodiments, a binary image can be formed by any two colors.

The magenta plane 500 may be binarized by setting each pixel to black or white based on whether the pixel satisfies one or more magenta criteria. The magenta criteria may include a threshold minimum or maximum magenta value, one or more magenta value ranges, or combinations thereof. Pixels that have magenta values above or below the threshold magenta value, and/or that have magenta values within or outside of one or more of the magenta value ranges will all be set to white or all be set to black. The magenta criteria may be predetermined for application to a plurality of crop images, or determined separately for each crop image. For example, the crop image 400 (FIG. 4) may undergo pre-processing to correct for image characteristics, such as white balance and lighting conditions, to provide sufficient uniformity to apply pre-determined magenta criteria. In other embodiments, magenta criteria are determined for each crop image 400 (FIG. 4) based on image characteristics (e.g. lighting and white balance) of the particular crop image. The binary image 600 of FIG. 6 was prepared with magenta criteria including a threshold magenta value of 0 on a scale from 0 to 255, where pixels having a magenta value above the threshold magenta value were set to white and where white pixels represent non-leaf imagery 604.

It will be appreciated that a mathematical relationship exists for the pixel-wise conversion of an RGB image to a CMYK image, so that an algorithm can be devised to create magenta-based binary image 600 from an RGB crop image without having to create or store a CMYK image.

At 312, processor 112 morphologically dilates binarized image 600 (FIG. 6) to create a dilated binarized image 700

(FIG. 7) having an enlarged non-leaf region 704 (e.g. white pixel region). This can be helpful for capturing additional non-leaf imagery from the crop image, especially where a conservative magenta profile was applied at 308 to avoid capturing plant leaves in the non-leaf region 604 (FIG. 6). For example, the magenta profile applied at 308 may not consistently capture portions of the non-leaf region which border plant leaves, and the morphological dilation may be effective at expanding the non-leaf region 704 (FIG. 7) to capture these border portions. In alternative embodiments, the magenta profile applied at 308 may be sufficiently accurate, so that the morphological dilation at 312 can be omitted.

Figure 7:
FIG. 7 is the binary image of FIG. 6 after dilation.
Figure 8:
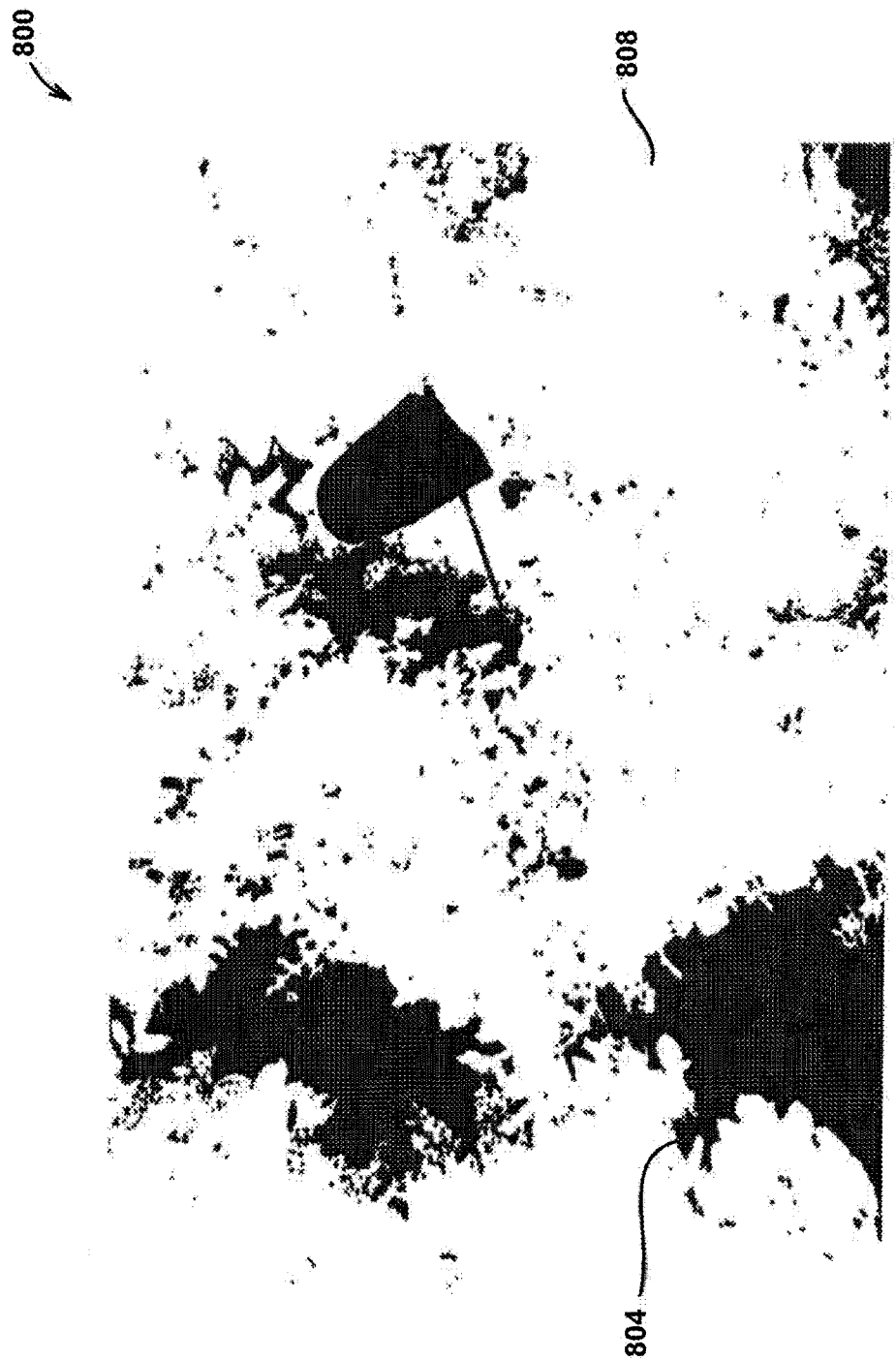
FIG. 8 is a magenta channel based image mask based on the dilated image of FIG. 7.

At 316, the processor 112 creates a first mask from the dilated binary image 700 (FIG. 7). Referring to FIG. 8, processor 112 may invert binary image 700 (FIG. 7) to create image mask 800. In the illustrated example, this allows non-leaf region 804 to be represented by black pixels, and the leaf region 808 to be represented by white pixels. This conforms to industry standards wherein black pixels in an image mask delete from (or paint-over) the image to which they are applied. For example, when image mask 800 is applied to crop image 400 (FIG. 4), the black non-leaf region 804 of image mask 800 will paint over the corresponding portion of crop image 400 (FIG. 4) with black, and the white leaf-region 808 of image mask 800 will leave the corresponding portion of crop image 400 (FIG. 4) undisturbed.

In alternative embodiments, the binarized image 600 (FIG. 6) created at 308 or dilated binarized image 700 (FIG. 7) created at 312 may be used directly as a mask without color inversion, by configuring the masking operation to treat the white and black pixels oppositely to standard convention.

At 320, processor 112 creates a second mask based on color channel thresholding (e.g. RGB thresholding). For example, processor 112 may create an image mask by binarizing crop image 400 (FIG. 4) based on color channel criteria (e.g. RGB criteria). The color channel criteria may include one or more predetermined threshold color channel values (e.g. RGB values), one or more predetermined color channel value ranges (e.g. RGB value ranges), or combinations thereof. For example, pixels that have RGB values above or below the threshold RGB values or that have RGB values within or outside one or more of the RGB value ranges will all be set to white or all be set to black. In one example, the RGB criteria includes an RGB value range of (17, 54, 17) to (174, 211, 153), where each of the Red, Green, and Blue channels are mapped within a range of 0-255, where pixels within the RGB value range are set to black to represent the non-leaf region and where the remaining pixels are set to white to represent the leaf region.

At 324, processor 112 applies the created color-based mask(s) to the crop image 400 (FIG. 4) to create a masked crop image. FIG. 9 shows an exemplary masked crop image 900 created by masking crop image 400 (FIG. 4) with the magenta plane based mask created at 316 and further masked by the RGB based mask created at 320. As shown, the painted-over second region 904 contains few or no plant leaves and the remaining first region 908 contains predominantly plants leaves with little or no non-leaf imagery. For example, first region 908 includes at least 80% of the plant leaves depicted in crop image 400 (FIG. 4), and second region 904 includes at least 80% of the non-leaf imagery depicted in crop image 400 (FIG. 4). During subsequent processing, leaf creasing and leaf discoloration are assessed based on the remaining first region 908.

Reference is now made to FIG. 2. After identifying first region 908 (FIG. 9) containing potato plant leaves 408 of crop image 400 (FIG. 4), the method proceeds with assessing the first region 908 (FIG. 9) for symptoms of potato virus and weighing those symptoms to determine whether the potato plants in the crop image are infected with potato virus (FIG. 9).

At 212, processor 112 segments crop image 400 (FIG. 4) into image segments. For example, processor 112 may conceptually divide crop image 400 (FIG. 4) or at least first region 908 (FIG. 9) into an array of distinct image segments. Each image segment can represent a distinct analytical block. Processor 112 may separately assess each image segment for virus symptoms. For example, processor 112 may repeat each of steps 216 to 236 for each image segment. Processor 112 may then determine whether any potato plants in the crop image 400 (FIG. 4) are infected with potato virus based on the quantum and grouping of image segments displaying virus symptoms.

Processor 112 can segment crop image 400 into any number of image segments (e.g. greater than 10 segments, such as 10-10,000 segments). The number of image segments may depend on the resolution and field of view of the crop image 400. For example, where the field of view of crop image 400 is small (e.g. crop image 400 captures very few plants or only a portion of a plant), then processor 112 may segment crop image 400 into relatively few image segments (e.g. 10-50 segments) so that individual image segments include a sufficient portion of a potato plant with which to perform an analysis for virus symptoms. In contrast, where the field of view of crop image 400 is large (e.g. crop image 400 captures many plants), then processor 112 may segment crop image 400 into many image segments (e.g. 51-10,000 segments) so that each plant or leaf in the crop image 400 is divided among several image segments for analysis. An image segment can have any size and shape. FIGS. 11-15 show examples including image segments 1104, 1204, 1304, 1404, and 1505 that are rectangular and uniformly sized. This may simplify the division of the image into image segments. In other embodiments, processor 112 may segment crop image 400 into image segments that are non-rectangular, such as circular or triangular segments, or segments of other regular or irregular shapes. Moreover, in some embodiments, processor 112 may segment crop image 400 into image segments of non-uniform shape and/or size. For example, the segments may include segments of multiple different shapes and/or multiple different sizes.

One symptom of some potato viruses, such as potato virus Y, is leaf creasing. At 216, processor 112 identifies leaf creasing within first region 908 (FIG. 9). Processor 112 can apply any process or algorithm that is effective for identifying leaf creasing. As compared with conventional texture analysis methods (e.g. GLCM texture analysis), the inventors have found that leaf creasing can be more quickly and computationally efficiently identified through the use of one or more (or all) of edge, line, and contour detection methods. In general, greater edges and lines and smaller contour areas within a segment of first region 908 (FIG. 9) can be symptomatic of potato virus.

At 220, processor 112 detects edges within the image segments of first region 908 (FIG. 9) and compares the detected edges against edge criteria symptomatic of potato virus leaf creasing. Processor 112 may use any edge detection method suitable for detecting edges within plant leaves, such as for example Canny edge detection. Canny edge detection uses dual (upper and lower) pixel gradient thresholds to distinguish detected edges from noise or natural color variation. For example, the upper and lower thresholds for Canny edge detection may be provided as follows:

$$\text{upper threshold} = \left(\frac{1 + \text{sigma}}{\text{mean}}\right)$$

$$\text{lower threshold} = \left(\frac{1 - \text{sigma}}{\text{mean}}\right)$$

In operation, if a pixel gradient value is greater than the upper threshold, the pixel is accepted as an edge; if a pixel gradient value is below the lower threshold, then it is rejected; and if a pixel gradient value is between the two thresholds, then it will be accepted as an edge only if it is connected to a pixel that is above the upper threshold. In this example, the upper threshold is one standard deviation above the average gradient in the image segment, and the lower threshold is one standard deviation below the average gradient in the image segment.

FIG. 10 is an image 1000 including edges 1004 detected by processor 112 within first region 908 (FIG. 9) represented by white pixels. Processor 112 may compare the detected edges 1004 (FIG. 10) against edge criteria symptomatic of potato virus leaf creasing. The edge criteria may include a threshold minimum quantum of edges, such as a threshold minimum number of edge pixels (e.g. white pixels) as an absolute number or as a proportion of the number of pixels within the segment (e.g. greater than 10% edge pixels). FIG. 11 illustrates an exemplary image 1100 showing segments 1104 identified by processor 112 as having greater than 13.8% edge pixels as being symptomatic of potato virus.

At 224, processor 112 detects discrete lines within the first region 908 (FIG. 9) defined by the edges 1004 (FIG. 10) detected at 220, and compares the detected lines against line criteria symptomatic of potato virus. Processor 112 may use any line detection method suitable for detecting lines within the edges detected at 220, such as Hough line detection for example. The line criteria may include a threshold minimum quantum of lines, such as a threshold minimum number of lines having a threshold minimum length. The threshold number of lines may be expressed as an absolute number or a density of real world area depicted by the segment (e.g. lines per square centimeter). The threshold length may be expressed as an absolute number of pixels, a real-world measurement (e.g. centimeters), or as a proportion of a dimension of the segment (e.g. percentage of the segment width), for example. FIG. 12 illustrates an exemplary image 1200 showing image segments 1204 identified by processor 112 as having at least 50 lines with a length of at least 50 pixels (e.g. at least 30% of the segment width).

At 228, processor 112 detects contours within the first region 908 (FIG. 9) defined by edges 1004 (FIG. 10) detected at 220, and compares the detected contours against contour criteria symptomatic of potato virus leaf creasing. A contour is a closed shape formed by the edges 1004 (FIG. 10) detected at 220 (e.g. a region completely surrounded by edge pixels). The inventors have found that, if no contour within a segment has an area exceeding a specific threshold area (e.g. 1500 pixels), then such segment is more likely to exhibit creasing symptomatic of potato virus. The contour criteria may include a threshold maximum contour area, which may be expressed as an absolute number of pixels, a real-world measurement (e.g. square centimeters), or as a proportion of the segment area (e.g. percentage of segment area). FIG. 13 illustrates an exemplary image 1300 showing image segments 1304 identified by processor 112 which meet a contour criterion, which is the absence of contours having an individual contour area exceeding 1500 pixels (e.g. 8.5% of the segment area).

Another symptom of some potato viruses, such as potato virus Y, is leaf discoloration. At 232, processor 112 compares the color profile of each image segment within first region 908 (FIG. 9) against color criteria. The color profile of an image segment can include any one or more values of any color property of that segment, which may include any one or more histogram properties (e.g. mean, mode, sigma, full width at half maximum, root mean squared, percentile, minimum, and maximum) for any channel or channels of any one or more color spaces (e.g., without limitation, RGB, CMYK, HSV, and HSL). Similarly, the color criteria can include any one or more values and/or value ranges of any such color property, where those values or value ranges may be symptomatic of potato virus leaf discoloration.

In one embodiment, the color profile of a segment includes the Euclidian distance in a color cone between two average color channel values in that segment. For example, the color profile may include the Euclidian distance in a color cone between the average green and red values, and between the average green and blue color values in the segment. FIG. 14 illustrates an exemplary image 1400 showing image segments 1404 that the processor 112 has identified as satisfying the following color criteria: Euclidean distance between average green and red of less than 3 or greater than 45.5, and Euclidean distance between average green and blue of less than 10 or greater than 113. Segments 1404 are symptomatic of potato virus discoloration.

At 236, processor 112 determines whether each segment displays symptoms of potato virus based on the leaf creasing criteria assessed at 216-228 and the color criteria assessed at 232. In some embodiments, processor 112 may assign a weighted value to the result of each leaf creasing and color comparison, and determine that a segment displays symptoms of potato virus where the sum of those weighted values exceeds a predetermined threshold. For example, processor 112 may assign a value of 20% for satisfying the edge criteria at 220, a value of 20% for satisfying the line criteria at 224, a value of 20% for satisfying the contour criteria at 228, and a value of 40% for satisfying the color criteria at 232, and then determine that a segment displays symptoms of potato virus where the sum exceeds 50%. This example allows a segment to be identified as displaying symptoms of potato virus where all of the leaf creasing criteria are satisfied, or where the color criteria and at least one leaf creasing criteria are satisfied. FIG. 15 illustrates an exemplary image 1500 showing image segments 1504 that processor 112 has identified as having satisfied at least one criteria (edge, line, contour, or color). Processor 112 has determined a weighted value for each segment 1504. The segments 1504 having a weighted value exceeding a predetermined threshold (e.g. 50%) are identified by the processor 112 as displaying symptoms of potato virus.

At 240, processor 112 determines whether crop image 400 (FIG. 4) contains potato virus based on whether the segments 1504 (FIG. 15) identified as displaying symptoms of potato virus at 236 satisfy quantum criteria. In some embodiments, the quantum criteria may include a threshold minimum number of segments 1504 (FIG. 15), which may be expressed as an absolute number (e.g. 5 segments) or a proportion of the total number of segments in crop image 400 (FIG. 4) formed at 212 (e.g. 0.5% of the total crop image segments). A farmer can use the crop images identified at 240 to locate virus infected plants on their farm (e.g. using the geo-tag or other location information associated with the crop image) and rogue those plants to prevent further spreading of the virus. This can reduce the crop yield loss due to the potato virus.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

The invention claimed is:

1. A method of detecting a potato virus in a crop image depicting at least one potato plant, the method comprising:
storing the crop image in a memory;
identifying, by a processor, a first region of the crop image, the first region depicting potato plant leaves, wherein the first region is exclusive of a second region of the crop image, the second region depicting non-leaf imagery;
identifying, by the processor, a plurality of edges within the first region;
determining, by the processor, whether an image segment of the crop image within the first region satisfies one or more leaf creasing criteria based on the edges that are located within the image segment, wherein the leaf creasing criteria are symptomatic of leaf creasing caused by the virus; and
determining, by the processor, whether the segment displays symptoms of potato virus based at least in part on whether the image segment satisfies the one or more leaf creasing criteria.

2. The method of claim 1, further comprising:
determining, by the processor, whether the crop image contains potato virus based on a quantum of image segments within the crop image that are identified as displaying symptoms of potato virus.

3. The method of claim 1, wherein:
the one or more leaf creasing criteria include a threshold minimum quantum of edges within the image segment.

4. The method of claim 1, wherein:
the one or more leaf creasing criteria include one or more line criteria, and determining whether the image segment satisfies the line criteria comprises identifying lines within the image segment defined by the edges.

5. The method of claim 4, wherein:
the one or more line criteria include a threshold minimum quantum of lines.

6. The method of claim 1, wherein:
the one or more leaf creasing criteria include one or more contour criteria, and determining whether the image segment satisfies the contour criteria comprises identifying contours within the image segment defined by the edges.

7. The method of claim 6, wherein:
the one or more contour criteria include whether every contour within the image segment has an area not exceeding a threshold maximum area.

8. The method of claim 1, wherein:
identifying the first region comprises creating a first mask based on a magenta channel of the crop image or of an image generated from the crop image.

9. The method of claim 8, wherein:
identifying the first region further comprises creating a second mask based on one or more predetermined threshold color channel value ranges.

10. A non-transitory computer-readable medium comprising instructions executable by a processor, wherein the instructions when executed configure the processor to:
store a crop image in a memory;
identify a first region of the crop image, the first region depicting potato plant leaves, wherein the first region is exclusive of a second region of the crop image, the second region depicting non-leaf imagery;
identify a plurality of edges within the first region;
determine whether an image segment of the crop image within the first region satisfies one or more leaf creasing criteria based on the edges that are located within the image segment, wherein the leaf creasing criteria are symptomatic of leaf creasing caused by a potato virus;
determine whether the segment displays symptoms of potato virus based at least in part on whether the image segment satisfies the one or more leaf creasing criteria.

11. The non-transitory computer-readable medium of claim 10, wherein the instructions when executed further configure the processor to:
determine whether the crop image contains potato virus based on a quantum of image segments within the crop image that are identified as displaying symptoms of potato virus.

12. The non-transitory computer-readable medium of claim 10, wherein:
the one or more leaf creasing criteria include a threshold minimum quantum of edges within the image segment.

13. The non-transitory computer-readable medium of claim 10, wherein:
the one or more leaf creasing criteria include one or more line criteria, and determining whether the image segment satisfies the line criteria comprises identifying lines within the image segment defined by the edges.

14. The non-transitory computer-readable medium of claim 13, wherein:
the one or more line criteria include a threshold minimum quantum of lines.

15. The non-transitory computer-readable medium of claim 10, wherein:
the one or more leaf creasing criteria include one or more contour criteria, and determining whether the image segment satisfies the contour criteria comprises identifying contours within the image segment defined by the edges.

16. The non-transitory computer-readable medium of claim 15, wherein:
the one or more contour criteria include whether every contour within the image segment has an area not exceeding a threshold maximum area.

17. The non-transitory computer-readable medium of claim 10, wherein:
identifying the first region comprises creating a first mask based on a magenta channel of the crop image or of an image generated from the crop image.

18. The non-transitory computer-readable medium of claim 17, wherein:

identifying the first region further comprises creating a second mask based on one or more predetermined threshold color channel value ranges.

19. A system for detecting potato virus in a crop image containing potato plants, the system comprising:
- a memory storing computer readable instructions and the crop image; and
- a processor configured to execute the computer readable instructions, the computer readable instructions configuring the processor to:
  - identify a first region of the crop image, the first region depicting potato plant leaves, wherein the first region is exclusive of a second region of the crop image, the second region depicting non-leaf imagery;
  - identify a plurality of edges within the first region;
  - determine whether an image segment of the crop image within the first region satisfies one or more leaf creasing criteria based on the edges that are located within the image segment, wherein the leaf creasing criteria are symptomatic of leaf creasing caused by the virus; and
  - determine whether the segment displays symptoms of potato virus based at least in part on whether the image segment satisfies the one or more leaf creasing criteria.

20. The system of claim 19, wherein the computer readable instructions further configure the processor to:
- determine whether the crop image contains potato virus based on a quantum of image segments within the crop image that are identified as displaying symptoms of potato virus.

21. The system of claim 19, wherein:
the one or more leaf creasing criteria include a threshold minimum quantum of edges within the image segment.

22. The system of claim 19, wherein:
the one or more leaf creasing criteria include one or more line criteria, and determining whether the image segment satisfies the line criteria comprises identifying lines within the image segment defined by the edges.

23. The system of claim 22, wherein:
the one or more line criteria include a threshold minimum quantum of lines.

24. The system of claim 19, wherein:
the one or more leaf creasing criteria include one or more contour criteria, and determining whether the image segment satisfies the contour criteria comprises identifying contours within the image segment defined by the edges.

25. The system of claim 24, wherein:
the one or more contour criteria include whether every contour within the image segment has an area not exceeding a threshold maximum area.

26. The system of claim 19, wherein:
identifying the first region comprises creating a first mask based on a magenta channel of the crop image or of an image generated from the crop image.

27. The system of claim 26, wherein:
identifying the first region further comprises creating a second mask based on one or more predetermined threshold color channel value ranges.

* * * * *